(12) United States Patent
Gu et al.

(10) Patent No.: US 10,921,230 B2
(45) Date of Patent: Feb. 16, 2021

(54) SUSPENSION PARTICLE SENSING APPARATUS

(71) Applicant: Industrial Technology Research Institute, Hsinchu (TW)

(72) Inventors: Guang-Huei Gu, Tainan (TW); Chih-Jen Chen, Tainan (TW); Jing-Yuan Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 58 days.

(21) Appl. No.: 16/214,149

(22) Filed: Dec. 10, 2018

(65) Prior Publication Data
US 2020/0103326 A1 Apr. 2, 2020

(30) Foreign Application Priority Data

Sep. 27, 2018 (TW) .............................. 107133982 A

(51) Int. Cl.
*G01N 15/02* (2006.01)
*G01N 15/14* (2006.01)

(52) U.S. Cl.
CPC ..... *G01N 15/0205* (2013.01); *G01N 15/1459* (2013.01); *G01N 2015/025* (2013.01)

(58) Field of Classification Search
CPC ........... G01N 15/1434; G01N 21/6458; G01N 15/06; G01N 15/1429; G01N 2021/656; G01N 21/474; G01N 21/6428; G01N 21/6452; G01N 21/65; G01N 21/7703; G01N 15/0211; G01N 15/0656; G01N 2015/0065; G01N 2015/03;
(Continued)

(56) References Cited

U.S. PATENT DOCUMENTS 7,292,338 B2 11/2007 Itagaki
7,782,459 B2 8/2010 Holve
(Continued)

FOREIGN PATENT DOCUMENTS

CN 103454194 12/2013
CN 203551443 4/2014
(Continued)

OTHER PUBLICATIONS

Tong et al., "Miniaturized PM2.5 Particulate Sensor Based on Optical Sensing," P2015 Northeast Section Conference of the American Society for Engineering Education, 2015, pp. 1.
(Continued)

Primary Examiner — Michael P Stafira
(74) Attorney, Agent, or Firm — JCIPRNET

(57) ABSTRACT

A suspension particle sensing apparatus includes a first flow channel, a suspension particle concentration sensor and a suspension particle filtering assembly. The first flow channel has a first entrance and a first exit. The suspension particle concentration sensor is disposed in the first flow channel, and is located between the first entrance and the first exit. The suspension particle filtering assembly is disposed at the first entrance, and includes a casing and a suspension particle filtering structure. The casing has a first opening and a second opening. The first opening is communicated with the first entrance of the first flow channel. The suspension particle filtering structure covers the second opening.

16 Claims, 7 Drawing Sheets

(58) Field of Classification Search
CPC ... G01N 2021/6419; G01N 2021/6421; G01N 21/64; G01N 21/6408; G01N 29/036; G01N 2015/0046; G01N 2015/1006; G01N 21/645; G01N 15/02; G01N 2015/0073; G01N 2015/008; G01N 2015/0084; G01N 2015/0693; G01N 2015/1087; G01N 2015/1486; G01N 2021/651; G01N 2021/655; G01N 2291/0256; G01N 2291/0427; G01N 2500/10; G01N 2800/324; G01N 21/658; G01N 29/022; G01N 29/4418; G01N 33/483; G01N 33/5008; G01N 33/502; G01N 33/5026; G01N 33/5044; G01N 33/54313; G01N 15/14; G01N 2015/0053; G01N 2021/6432; G01N 21/51; G01N 2291/02836; G01N 2291/0422; G01N 2291/0423; G01N 2291/0426; G01N 33/56911; G01N 15/0266; G01N 15/0606; G01N 15/1456; G01N 1/2252; G01N 1/24; G01N 2001/2264; G01N 2015/0007; G01N 2015/0222; G01N 2015/0687; G01N 2015/1493; G01N 2021/152; G01N 2021/4728; G01N 2021/6441; G01N 2021/8405; G01N 21/534; G01N 21/6486; G01N 21/76; G01N 21/85; G01N 2201/06113; G01N 2201/1087; G01N 2201/12; G01N 2291/017; G01N 2291/022; G01N 2291/02809; G01N 2291/2636; G01N 27/125; G01N 27/126; G01N 27/22; G01N 27/44721; G01N 29/02; G01N 33/02; G01N 33/2888; G01N 33/49; G01N 33/86; G01N 15/0205; G01N 15/0618; G01N 1/2273; G01N 2001/024; G01N 2015/0038; G01N 2015/025; G01N 2015/1068; G01N 2021/0382; G01N 2021/052; G01N 2021/399; G01N 2021/4707; G01N 2021/4711; G01N 21/0332; G01N 21/05; G01N 21/314; G01N 21/39; G01N 21/53; G01N 2201/0642; G01N 33/0034; G01N 33/0047; G01N 33/54326; G01N 33/54373; G01N 33/9493; G01N 35/0098; G01N 5/00; G01N 21/0076; G01N 6/02052; G01N 6/04; G01N 6/241; G01N 6/262; G01N 6/29368; G01N 6/4203; G01N 21/008; G01N 21/0084; G01N 21/16; G01N 27/0093; G01N 27/017; G01N 6/12007; G01N 6/29361; G01N 6/29362; G01N 6/29364; G01N 6/29388; G01N 6/403; G01N 21/0032; G01N 27/0172; G01N 21/0004; G01N 21/0052; G01N 21/0064; G01N 27/0141; G01N 2027/0187; G01N 2015/0288; G01N 15/0255; G01N 15/1459; G01N 2011/4088; G01N 15/10; G01N 15/1484; G01N 1/4077; G01N 2015/1081; G01N 2015/149; G01N 15/1436; G01N 1/4005; G01N 33/538; G01N 33/545; G01N 33/585; G01N 15/08; G01N 15/12; G01N 15/1245; G01N 15/1404; G01N 15/1427; G01N 15/1463; G01N 15/147; G01N 15/1475; G01N 1/10; G01N 1/28; G01N 1/34; G01N 1/405; G01N 2001/027; G01N 2001/1012; G01N 2015/0662; G01N 2015/0681; G01N 2015/084; G01N 2015/086; G01N 2015/1062; G01N 2015/1481; G01N 2015/1497; G01N 2021/6439; G01N 2021/653; G01N 21/1702; G01N 21/3151; G01N 21/35; G01N 21/3563; G01N 21/83; G01N 2201/0612; G01N 2458/00; G01N 27/02; G01N 29/2418; G01N 33/54333; G01N 33/566; G01N 33/56972; G01N 33/57488; G01N 33/80; G01N 35/1095; G01J 1/42; G01J 1/0411; G01J 3/42; G01J 3/4406; G02B 21/0076; G02B 6/02052; G02B 6/04; G02B 6/241; G02B 6/262; G02B 6/29368; G02B 6/4203; G02B 21/008; G02B 21/0084; G02B 21/16; G02B 27/0093; G02B 27/017; G02B 6/12007; G02B 6/29361; G02B 6/29362; G02B 6/29364; G02B 6/29388; G02B 6/403; G02B 21/0032; G02B 27/0172; G02B 21/0004; G02B 21/0052; G02B 21/0064; G02B 2027/141; G02B 2027/187

See application file for complete search history.

(56) References Cited

U.S. PATENT DOCUMENTS

| 7,932,490 | B2 | 4/2011 | Wang et al. |
| 8,154,723 | B2 | 4/2012 | Fu et al. |
| 8,534,116 | B2 | 9/2013 | Wang et al. |
| 9,116,121 | B2 | 8/2015 | Kaye et al. |
| 9,423,335 | B2 | 8/2016 | Gabriel |
| 2005/0006296 | A1* | 1/2005 | Sullivan ............... A61M 1/262 210/321.6 |
| 2014/0260542 | A1* | 9/2014 | Nagano ................ G01N 1/2211 73/28.04 |
| 2015/0116710 | A1 | 4/2015 | Nicoletti |
| 2017/0115197 | A1* | 4/2017 | Niemela .................. G01N 5/00 |
| 2017/0254737 | A1 | 9/2017 | Ke et al. |
| 2017/0268980 | A1* | 9/2017 | Clayton ............ G01N 21/6486 |
| 2018/0017477 | A1* | 1/2018 | Mauro .................... G01T 1/178 |

FOREIGN PATENT DOCUMENTS

| CN | 104266947 | 1/2015 |
| CN | 104266948 | 1/2015 |
| CN | 204128925 | 1/2015 |
| CN | 104596904 | 5/2015 |
| CN | 204536159 | 8/2015 |
| CN | 204555071 | 8/2015 |
| CN | 204789269 | 11/2015 |
| CN | 105136637 | 12/2015 |
| CN | 205246490 | 5/2016 |
| CN | 106066296 | 11/2016 |
| CN | 107328695 | 11/2017 |
| CN | 107421859 | 12/2017 |
| CN | 105021501 | 1/2018 |
| CN | 107923295 | 4/2018 |
| TW | 200821030 | 5/2008 |
| TW | 201621294 | 6/2016 |
| TW | 201708804 | 3/2017 |
| TW | I603066 | 10/2017 |
| WO | 2018100209 | 6/2018 |

OTHER PUBLICATIONS

Sachit Mahajan et al., "Short-Term PM2.5 Forecasting Using Exponential Smoothing Method: A Comparative Analysis," Sensors, 2018, pp. 1-15.

(56) References Cited

OTHER PUBLICATIONS

Grimm et al., "Aerosol measurement: the use of optical light scattering for the determination of particulate size distribution, and particulate mass, including the semi-volatile fraction," Journal of the Air and Waste Management Association, Jan. 2009, pp. 1-9.
Wang et al., "A Novel Optical Instrument for Estimating Size Segregated Aerosol Mass Concentration in Real Time," Aerosol Science and Technology, Jul. 2007, pp. 1-13.
Liu et al., "A System Calibration Model for Mobile PM2.5 Sensing Using Low-Cost Sensors," 2017 IEEE International Conference on Internet of Things (iThings) and IEEE Green Computing and Communications (GreenCom) and IEEE Cyber, Physical and Social Computing (CPSCom) and IEEE Smart Data (SmartData), Jun. 2017, pp. 611-618.
"Office Action of Taiwan Counterpart Application," dated Apr. 11, 2019, p. 1-p. 7.

\* cited by examiner

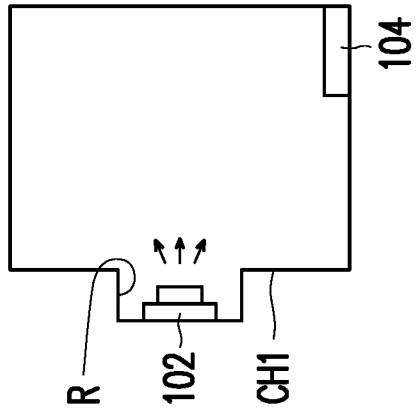
FIG. 2A
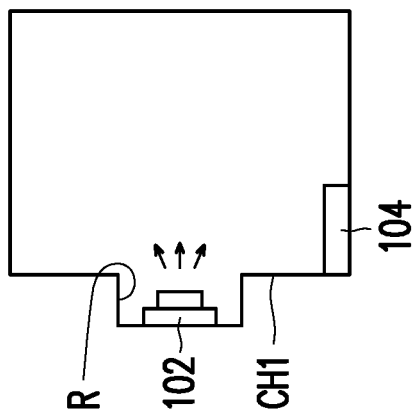
FIG. 2B
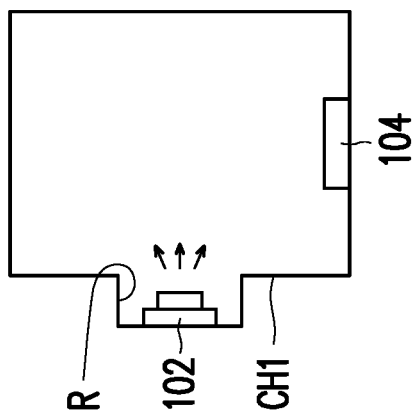
FIG. 2C
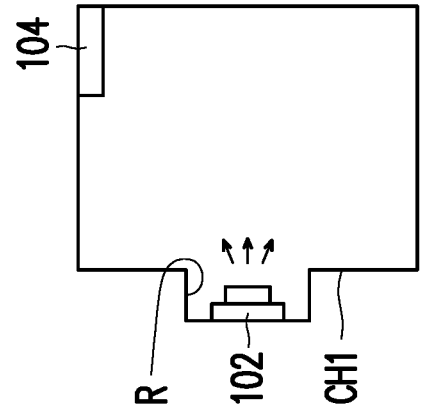
FIG. 2D
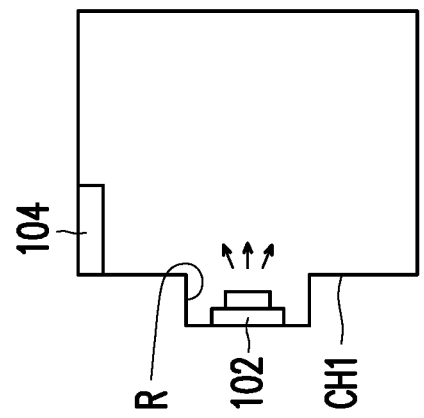
FIG. 2E
FIG. 2F

SUSPENSION PARTICLE SENSING APPARATUS

CROSS REFERENCE TO RELATED APPLICATION

This application claims the priority benefit of Taiwan application serial no. 107133982, filed on Sep. 27, 2018. The entirety of the above-mentioned patent application is hereby incorporated by reference herein.

BACKGROUND

Technical Field

The present disclosure is related to a sensing apparatus, and also relates to a suspension particle sensing apparatus.

Description of Related Art

Fine particles suspended in the atmosphere is also known as particulate matter (PM), which has various diameters. For instance, the suspension particles having a diameter not greater than 2.5 µm are referred as PM 2.5. Suspension particles may stay in the atmosphere for a very long period of time, and may be inhaled into humans and animals to cause a health problem. Various suspension particle sensing apparatus have been developed to detect a concentration of the suspension particles in the atmosphere. However, current suspension particle sensing apparatus fail to accurately distinguish the suspension particles with different diameters. Accordingly, it is difficult to detect a concentration of the suspension particles with a certain diameter range (e.g., PM 2.5).

SUMMARY

A suspension particle sensing apparatus according to some embodiments of the present disclosure comprises a first flow channel, a suspension particle concentration sensor and a suspension particle filtering assembly. The first flow channel has a first entrance and a first exit. The suspension particle concentration sensor is disposed in the first flow channel, and located between the first entrance and the first exit. The suspension particle filtering assembly is disposed at the first entrance of the first flow channel, and comprises a casing and a suspension particle filtering structure. The casing has a first opening and a second opening. The first opening is communicated with the first entrance of the first flow channel. The suspension particle filtering structure covers the second opening.

A suspension particle sensing apparatus according to some other embodiments of the present disclosure comprises a first flow channel, a suspension particle concentration sensor, a suspension particle filtering assembly and a concentration compensation system. The first flow channel has a first entrance and a first exit. The suspension particle concentration sensor is disposed in the first flow channel, and located between the first entrance and the first exit. The suspension particle filtering assembly is disposed at the first entrance of the first flow channel, and comprises a casing and a suspension particle filtering structure. The casing has a first opening and a second opening. The first opening is communicated with the first entrance of the first flow channel. The suspension particle filtering structure covers the second opening and has a plurality of holes. The concentration compensation system is configured to calculate a suspension particle concentration compensation coefficient according to a variation of an air flow rate in the first flow channel or to known and detected concentration values of the suspension particles in the first flow channel. The suspension particle concentration compensation coefficient is applied to calibrate a detection value of the suspension particle concentration sensor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2A through FIG. 2F are schematic diagrams respectively illustrating a configuration of a light source module and a photoelectronic device according to some embodiments of the present disclosure.

DESCRIPTION OF THE EMBODIMENTS

Figure 1A:
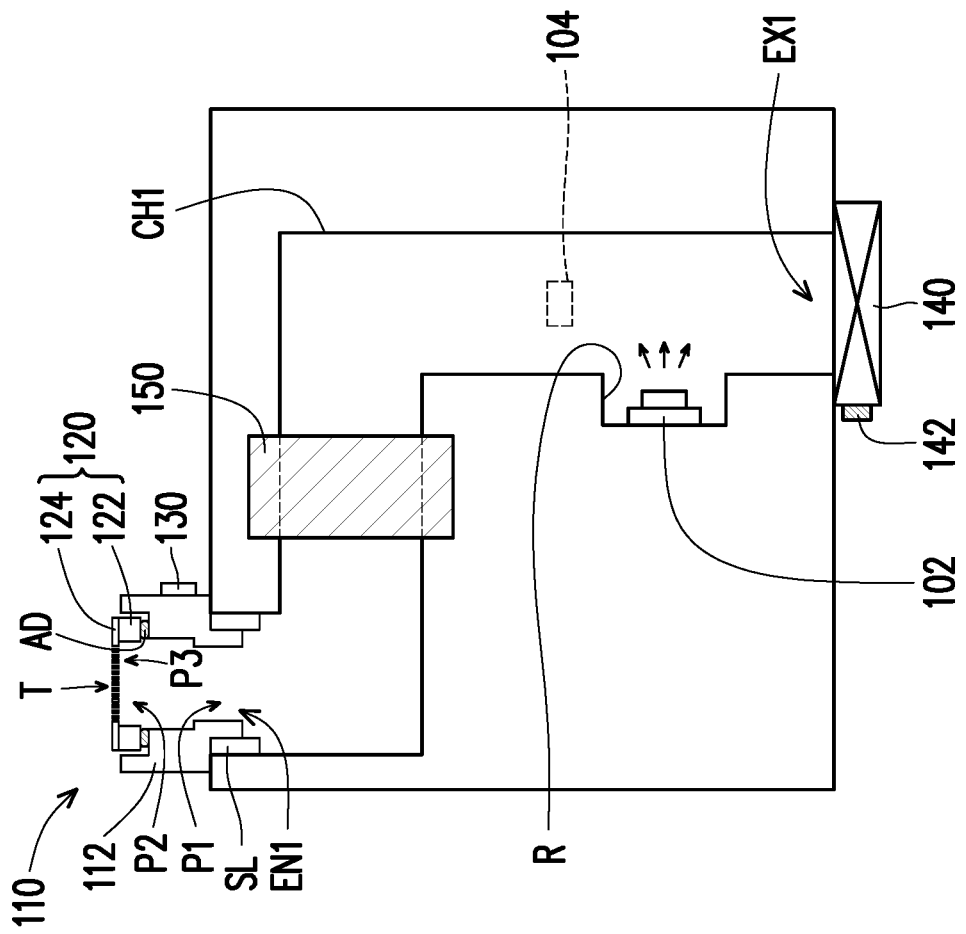
FIG. 1A is a schematic diagram illustrating a suspension particle sensing apparatus according to some embodiments of the present disclosure.
Figure 1B:
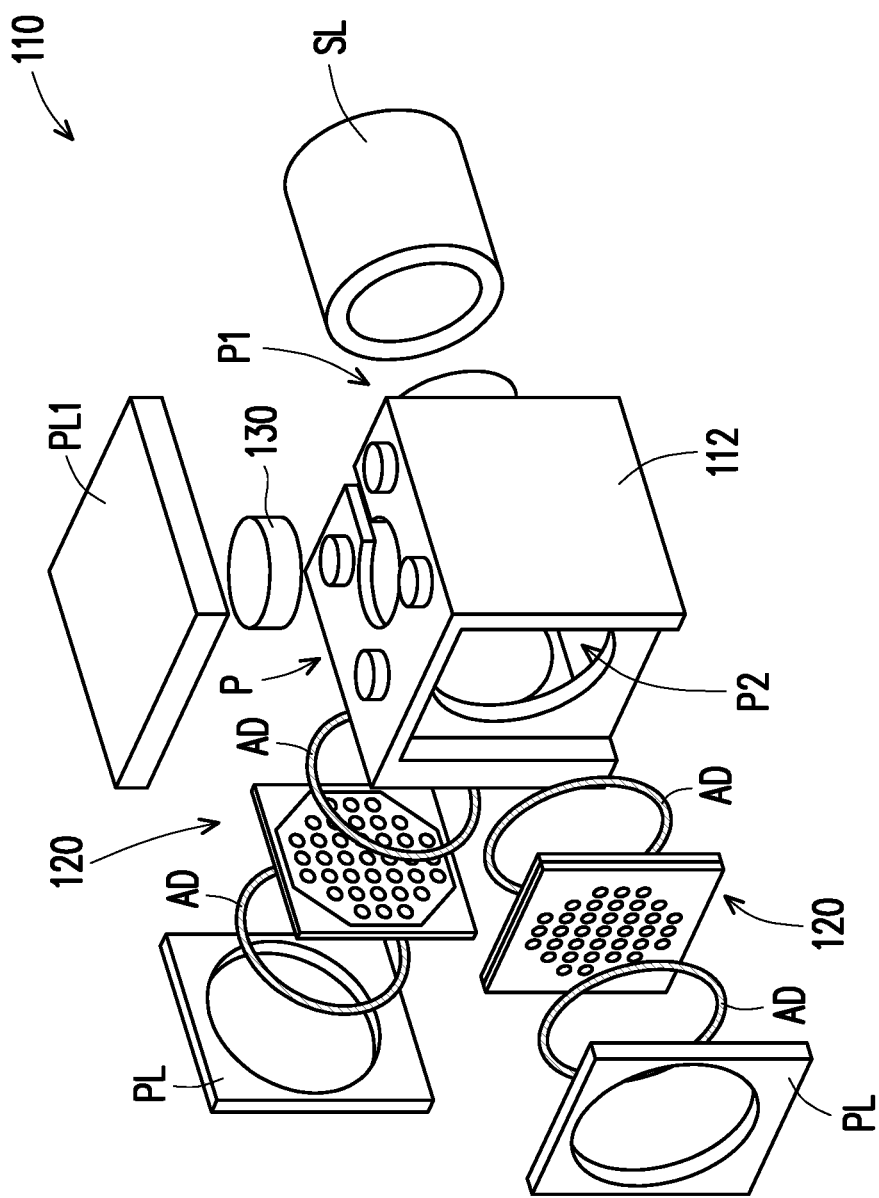
FIG. 1B is an explosive view of a suspension particle filtering assembly according to some embodiments of the present disclosure.
Figure 1C:
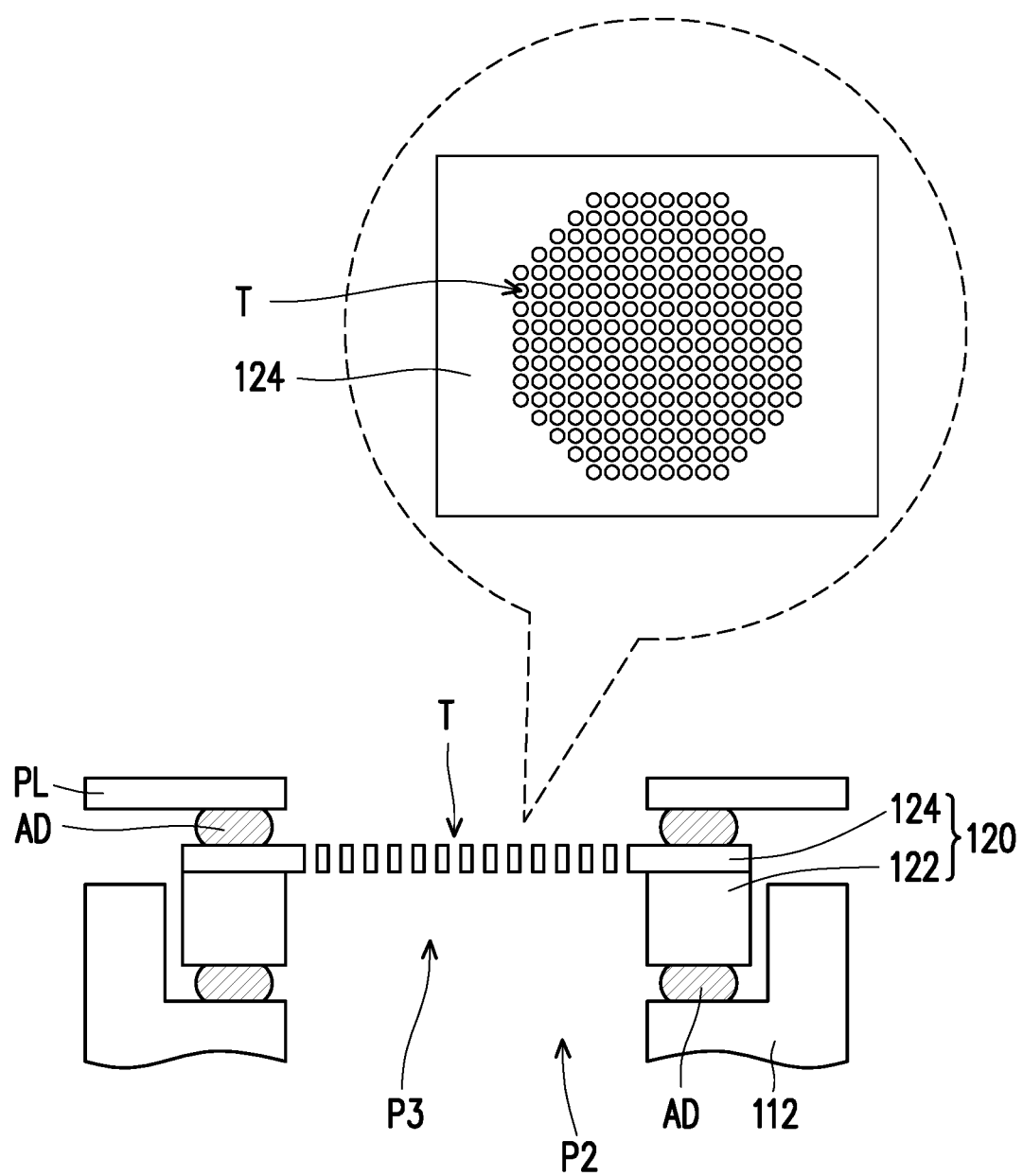
FIG. 1C is an enlarged cross-sectional view of a suspension particle filtering structure according to some embodiments of the present disclosure.

FIG. 1A is a schematic diagram illustrating a suspension particle sensing apparatus 10 according to some embodiments of the present disclosure. FIG. 1B is an explosive view of a suspension particle filtering assembly according to some embodiments of the present disclosure. FIG. 1C is an enlarged cross-sectional view of a suspension particle filtering structure according to some embodiments of the present disclosure.

Referring to FIG. 1A, the suspension particle sensing apparatus 10 according to embodiments of the present disclosure includes a first flow channel CH1. The first flow channel CH1 has a first entrance EN1 and a first exit EX1. An air flow carrying suspension particles may enter the first flow channel CH1 via the first entrance EN1, and leave the first flow channel CH1 via the first exit EX1. In some embodiments, a path of the first flow channel CH1 may have one or more turning portions. In other embodiments, the first flow channel CH1 may be a line-shape flow channel or a curve-shape flow channel. Those skilled in the art may modify the pattern and the dimension of the first flow channel CH1, the present disclosure is not limited thereto.

The suspension particle sensing apparatus 10 further includes a suspension particle concentration sensor 100. The suspension particle concentration sensor 100 is disposed in the first flow channel CH1, and located between the first entrance EN1 and the first exit EX1. In some embodiments, the suspension particle concentration sensor 100 is an optical sensor. For instance, the suspension particle concentration sensor 100 may include a light source module 102 and a photoelectronic device 104. In some embodiments, the suspension particle concentration sensor 100 may further include other elements (not shown), such as a power conversion module, an optical to electrical conversion circuit and a micro-controller. The light source module 102 may be disposed at a side of the first flow channel CH1, and the photoelectronic device 104 is disposed an adjacent side of the first flow channel CH1. In other words, the light source module 102 and the photoelectronic device 104 may not be faced with one another. In some embodiments, a sidewall of the first flow channel CH1 may have a recess R, which is configured to accommodate the light source module 102. The light source module 102 is such as a laser diode, and the photoelectronic device 104 is such as a photo diode. The light source module 102 is configured to cast light into the first flow channel CH1. The light cast into the first flow channel CH1 would be scattered by the suspension particles. The photoelectronic device 104 disposed aside the light source module 102 may receive and convert the scattered light into electrical signals. In some embodiments, these electrical signals may be pulse signals. Intensity of the pulse signals is related to dimensions of the suspension particles in the first flow channel CH1, and counts of the pulse signals per unit time is related to a concentration of the suspension particles in the first flow channel CH1. Accordingly, the concentration of the suspension particles with a certain diameter range in the atmosphere can be calculated via algorithm. In some embodiments, the above-mentioned unit time may be referred as 1 second, or other period of time, the present disclosure is not limited thereto.

FIG. 2A through FIG. 2F are schematic diagrams respectively illustrating a configuration of a light source module 102 and a photoelectronic device 104 according to some embodiments of the present disclosure. The schematic diagrams of FIG. 2A through FIG. 2F are cross-sectional views of the first flow channel CH1, and are facing the first exit EX1.

In some embodiments, a cross-sectional shape of the first flow channel CH1 may be rectangular. For instance, referring to FIG. 2A through FIG. 2F, the light source module 102 may be disposed at a left sidewall of the first flow channel CH1, and the photoelectronic device 104 may be disposed at a top wall or a bottom wall of the first flow channel CH1. In addition, those skilled in the art may adjust the spacing between the photoelectronic device 104 and the light source module 102 according to actual needs. As such, the photoelectronic device 104 may be located at a left side (as shown in FIG. 2B and FIG. 2E) or a right side (as shown in FIG. 2C and FIG. 2F) with respect to the top/bottom wall of the first flow channel CH1, at the top/bottom side (as shown in FIG. 2A and FIG. 2D) of the first flow channel CH1 or located at somewhere else. In alternative embodiments, the cross-sectional view of the first flow channel CH1 may be in other shapes, such as a circular shape, an oval shape, a polygonal shape or the like, the present disclosure is not limited thereto.

Referring to FIG. 1A through FIG. 1C, the suspension particle sensing apparatus 10 further includes a suspension particle filtering assembly 110. To be concise, only some of the elements in the suspension particle filtering assembly 110 are illustrated in FIG. 1B. the suspension particle filtering assembly 110 is disposed at the first entrance EN1 of the first flow channel CH1. In some embodiments, the suspension particle filtering assembly 110 includes a casing 112. The casing 112 has a first opening P1 and a second opening P2. In some embodiments, the first opening P1 and the second opening P2 are facing each other. The first opening P1 is communicated with the first entrance EN1 of the first flow channel CH1, and the second opening P2 is communicated to the atmosphere. In some embodiments, a sleeve SL is disposed between the casing 112 and the first entrance EN1 of the first flow channel CH1. The casing 112 may be in a cubic shape, a spherical shape, a polyhedral shape or the like. Those skilled in the art may adjust the dimension, shape and material of the casing 112 according to design requirement, the present disclosure is not limited thereto.

Referring to FIG. 1A through FIG. 1C, the suspension particle filtering assembly 110 further includes a suspension particle filtering structure 120. The second opening P2 of the casing 112 is covered by the suspension particle filtering structure 120. As such, air from the atmosphere may initially pass through the suspension particle filtering structure 120, then enter the first flow channel CH1 via the first opening P1 of the casing 112. In some embodiments, the casing 112 may further have one or more additional opening P (as shown in FIG. 1B) other than the first opening P1 and the second opening P2. Additionally, the suspension particle filtering assembly 110 may include a plurality of the suspension particle filtering structures 120 to cover the second opening P2 and the above-mentioned one or more additional openings P. Accordingly, an amount of the suspension particles flowing through the casing 112 from the atmosphere can be increased.

Referring to FIG. 1C, in some embodiments, the suspension particle filtering structure 120 may be a microelectromechanical system (MEMS). In these embodiments, the suspension particle filtering structure 120 includes a semiconductor substrate 122 and a suspension particle filtering layer 124 disposed on the semiconductor substrate 122. In some embodiments, the semiconductor substrate 122 may be regarded as a portion of a semiconductor wafer or a semiconductor-on-insulator (SOI) wafer. The semiconductor substrate 122 has an opening P3, and the opening P3 is communicated with the second opening P2 of the casing 112. The semiconductor substrate 122 may be functioned as a supporting structure of the suspension particle filtering layer 124, so as to improve a mechanical strength of the suspension particle filtering structure 120. In some embodiments, a thickness of the semiconductor substrate 122 may range from 400 µm to 480 µm. The suspension particle filtering layer 124 is disposed on the semiconductor substrate 122, and has a plurality of through holes T. The through holes T are communicated with the opening P3 of the semiconductor substrate 122. The through holes T may be configured to filter the suspension particles flowing into the first flow channel CH1 by the size of these suspension particles. The suspension particles greater than the aperture of the through holes T fail to pass through the suspension particle filtering layer 124, and the suspension particles smaller than the aperture of the through hole T may enter the first flow channel CH1 (as shown in FIG. 1A) through the suspension particle filtering layer 124. For instance, when the suspension particles to be detected have a diameter not greater than 2.5 µm (i.e., PM 2.5), the aperture of the through holes T may range from 3 µm to 5 µm.

In some embodiments, a formation method of the through holes T may include performing a lithography process and an etching process on the suspension particle filtering layer 124. In other embodiments, the through holes T may be formed by an electroforming process, a casting process, a spark machining process, a laser process or the like. As such, the through holes T may have substantially the same aperture and the same shape. Therefore, a particle filtering accuracy is improved. In other words, the diameter of the suspension particles entering the first flow channel CH1 can be accurately controlled within a certain range, such that a detection accuracy of the suspension particle sensing apparatus 10 on the concentration of the suspension particles is improved. In some embodiments, the aperture of the through holes T is substantially constant along an extension direction of the through holes T. In other words, the through holes T are formed as straight tubes. In other embodiments, the through holes T may diverge toward a side of the suspension particle filtering layer 124 that is facing the semiconductor substrate 122, so as to be in a funnel shape, respectively. In some embodiments, a thickness of the suspension particle filtering layer 124 (i.e., the depth of the through holes T) may range from 2 µm to 25 µm. Moreover, a top view shape of the through hole T may be circular, rectangular or polygonal. Additionally, the through holes T may be arranged in an array within a central region of the suspension particle filtering layer 124, and a peripheral region of the suspension particle filtering layer 124 may be free of the through holes T.

In some embodiments, a material of the semiconductor substrate 122 may include an elemental semiconductor material or a compound semiconductor material. For instance, the elemental semiconductor material may include Si, Ge or the like. The compound semiconductor material may include SiGe, InGaP or the like. In addition, a material of the suspension particle filtering layer 124 may include a semiconductor material, a metal material or an insulating material. For instance, the material of the suspension particle filtering layer 124 may include Si, silicon nitride, polyimide, Ni—Co alloy or Pd—Ni alloy. In some embodiments, a surface treatment may be performed on the suspension particle filtering structure 120, such that a surface of the suspension particle filtering structure 120 may modified to be hydrophobic or oleophobic. In these embodiments, a surface modification layer may be coated on the surface of the suspension particle filtering structure 120 (e.g., the surface of the suspension particle filtering layer 124).

In alternative embodiments, the suspension particle filtering structure 120 may be a porous film. For instance, the porous film may be polytetrafluoroethene (PTFE), polypropylene (PP), stainless steel or polycarbonate (PC). The porous film includes a plurality of through holes as well, the through holes may be arranged randomly, and these through holes may have different apertures and different top view shapes. Additionally, as compared to the suspension particle filtering layer 124 as shown in FIG. 1A through FIG. 1C, the porous film may have a higher surface roughness.

In addition, referring to FIG. 1B and FIG. 1C, in some embodiments, the suspension particle filtering assembly 110 may further include a passivation layer PL. The passivation layer PL covers the suspension particle filtering structure 120, and has an opening to expose the through holes T. In some embodiments, a portion of the casing 112 around the second opening P2 may have a recess, and the suspension particle filtering structure 120 may be disposed at a bottom surface of this recess. Moreover, in some embodiments, an adhesive layer AD may be disposed between the suspension particle filtering structure 120 and the bottom surface of this recess, and/or between the suspension particle filtering structure 120 and the passivation layer PL. For instance, the adhesive layer AD may be an O-ring.

Referring to FIG. 1A and FIG. 1B, the suspension particle filtering assembly 110 further includes a vibrator 130. The vibrator 130 is disposed on a surface of the casing 112. In some embodiments, the vibrator 130 may be disposed on the surface of the casing 112 that is free of opening. The vibrator 130 may include a vibration motor, a piezoelectric microactuator, the like or combinations thereof. The vibrator 130 disposed in the suspension particle filtering assembly 110 is helpful for removing large suspension particles unable to pass through the through holes T and deposited on the suspension particle filtering layer 124. Accordingly, a problem that the detection accuracy of the suspension particle sensing apparatus 10 is degraded as a result of the through holes T being blocked can be avoided. In some embodiments, a passivation layer PL1 may be further disposed to cover and protect the vibrator 130.

Referring to FIG. 1A, even though the vibrator 130 is helpful for removing the large suspension particles deposited on the suspension particle filtering structure 120, suspension particles or dust from the atmosphere may gradually jam the through holes T of the suspension particle filtering layer 124 after a period of operation time. As a result, a flow rate of the air flow in the first flow channel CH1 may be lowered, and an amount of the suspension particles carried by the air flow in the first flow channel CH1 may decrease. As such, a concentration of the suspension particles measured by the suspension particle concentration sensor 100 may be less than an actual concentration of these suspension particles in the atmosphere. In some embodiments, a calibration on the measured concentration of suspension particles may be performed to avoid inaccuracy caused by jamming of the suspension particle filtering structure 120. The calibrated concentration of the suspension particles is obtained via dividing the instant detected concentration value obtained from the suspension particle concentration sensor 100 by a suspension particle concentration compensation coefficient. The suspension particle concentration compensation coefficient is a ratio of the instant air flow rate with respect to an initial air flow rate in the first flow channel CH1. The initial air flow rate is defined as an air flow rate measured right after the suspension particle filtering structure 120 is renewed.

In some embodiments, the detected concentration value obtained from the suspension particle concentration sensor 100 may be calibrated by a concentration compensation system CS. The concentration compensation system CS is configured to calculate the suspension particle concentration compensation coefficient according to a flow rate of the air carrying the suspension particles flowing through the first flow channel CH1. The suspension particle concentration compensation coefficient may be applied to calibrate the detected concentration value obtained by the suspension particle concentration sensor 100, so as to obtain a more accurate concentration of the suspension particles.

Referring to FIG. 1A, in some embodiments, the concentration compensation system CS includes a flow meter 150. The flow meter 150 is disposed at the first flow channel CH1, and between the first entrance EN1 and the first exit EX1. The flow meter 150 is configured to measure and record the above-mentioned initial and instant flow rates of the air carrying the suspension particles through the first flow channel CH1 per unit time after the suspension particle filtering structure 120 is renewed. As such, the initial and instant flow rates can be obtained, and the suspension particle concentration compensation coefficient can be calculated. In addition, this suspension particle concentration compensation coefficient may be applied to calibrate the detected concentration value obtained by the suspension particle concentration sensor 100. In some embodiments, the suspension particle concentration compensation coefficient may be obtained by the equation (1), and the detected concentration value obtained by the suspension particle concentration sensor 100 may be calibrated by the equation (2).

$$PDC = V_P/V_0 \qquad (1)$$

$$V_C = C_P/PDC \qquad (2)$$

The PDC is the suspension particle concentration compensation coefficient, and the $V_P$ and $V_0$ are respectively the instant flow rate and the initial flow rate. In addition, the $V_C$ is the calibrated concentration value of the suspension particles, and the $C_P$ is the instant detected concentration value that has not been calibrated.

In some embodiments, the flow meter 150 may measure and record the flow rate of the air flow in the first flow channel CH1 per second. In other embodiments, the flow meter 150 may measure and record the flow rate of the air flow in the first flow channel CH1 per 5 minutes or per hour. In addition, in some embodiments, when the obtained suspension particle concentration compensation coefficient is lowered than a predetermined minimum value, the flow meter 150 may send an alert signal to remind an operator to renew the suspension particle filtering structure 120. For instance, the alert signal may be a flash light, or the alert signal may be sent to a terminal equipment via wire or wireless transmission manners.

Referring to FIG. 1A, in some embodiments, the suspension particle sensing apparatus 10 may further include a pumping system 140. The pumping system 140 is disposed at the first exit EX1 of the first flow channel CH1. The flow rate of the air flow carrying the suspension particles through the first flow channel CH1 may be effectively controlled by adjusting a pumping velocity of the pumping system 140. As such, a detection accuracy of the suspension particle sensing apparatus 10 on the concentration of the suspension particles may be further improved.

In some embodiments, the pumping system 140 is a pumping system with a feedback compensation function, and the concentration compensation system CS includes an ammeter 142 disposed on this pumping system 140. In other words, the pumping system 140 is capable of adjusting the pumping velocity according to an inlet pressure of the pumping system, so as to maintain a substantially constant exhaust volume. When the through holes T of the suspension particle filtering layer 124 are gradually jammed by suspension particles or dust in the atmosphere, the flow rate of the air flow in the first flow channel CH1 may decrease, as well as an amount of the suspension particles carried by the air flow. In this situation, the pumping system 140 with the feedback compensation function may raise the pumping velocity, which indicates that a higher input current for the pumping system 140 is required. The ammeter 142 may measure and record the input current of the pumping system 140 per unit time after the suspension particle filtering structure 120 is renewed. Additionally, the flow meter 150 may measure and record the flow rate of the air flow in the first flow channel CH1 per unit time after the suspension particle filtering structure 120 is renewed. A general equation of the flow rate of the air flow in the first flow channel CH1 with respect to the input current of the pumping system 140 may be obtained from the recorded input current and the flow rate. Therefore, the instant flow rate can be calculated by substituting the input current corresponding to the instant flow rate (may be referred as an instant input current) into the general equation.

Figure 3:
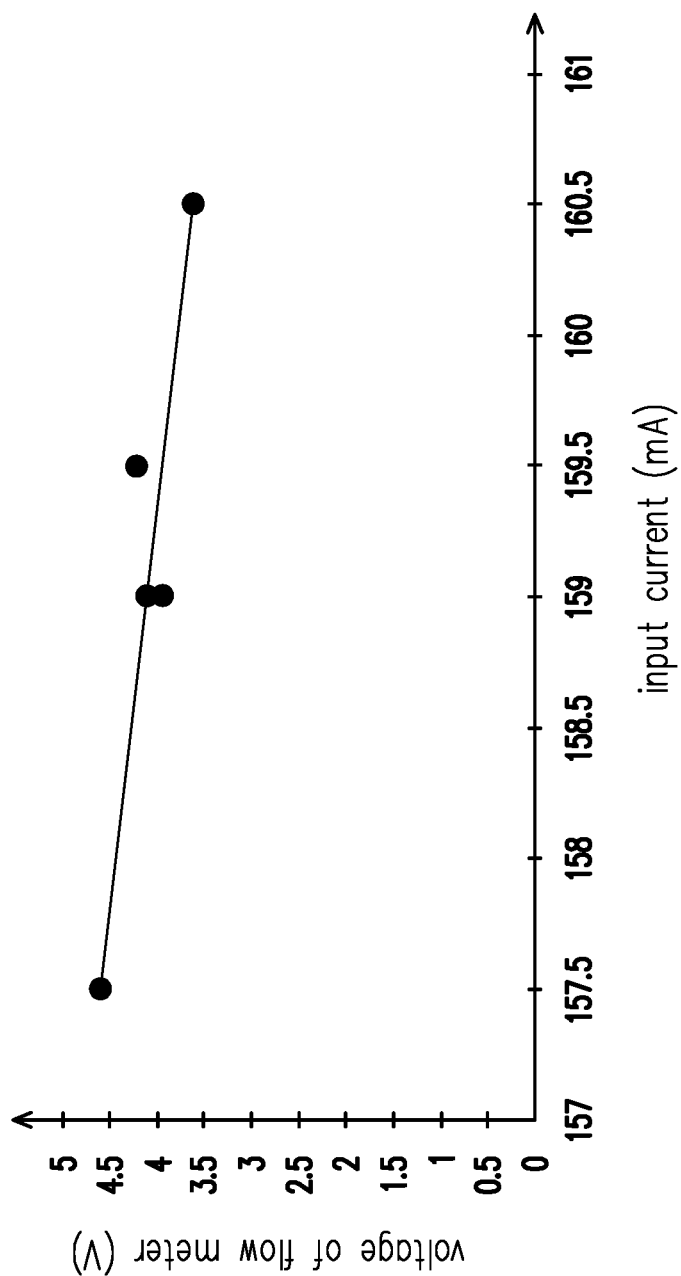
FIG. 3 illustrates a relationship between a voltage of a flow meter with respect to an input current of a pumping system disposed at a first flow channel.

FIG. 3 illustrates a relationship between a voltage of a flow meter 150 with respect to an input current of a pumping system 140 disposed at the first flow channel CH1.

Referring to FIG. 3, in some embodiments, the flow rate in the above-mentioned general equation is represented by a voltage of the flow meter 150. In other words, the above-mentioned general equation may be represented by the voltage of the flow meter 150 and the input current of the pumping system 140. In general, the voltage of the flow meter 150 is proportional to the flow rate of the air flow in the first flow channel CH1. When the instant input current is substituted into this general equation, the corresponding voltage of the flow meter 150 can be obtained, so as to obtain the instant flow rate. In some embodiments, the above-mentioned general equation is a polynomial.

Thereafter, the initial flow rate and the instant flow rate may be substituted into the equation (1), so as to obtain the suspension particle concentration compensation coefficient. Afterwards, the suspension particle concentration compensation coefficient may be substituted into the equation (2), to obtained the calibrated concentration value of the suspension particles.

In some embodiments, the ammeter 142 may measure and record the input current of the pumping system 140 per unit second. In other embodiments, the ammeter 142 may measure and record the input current of the pumping system 140 per 5 minutes or per hour. In addition, in some embodiments, when the suspension particle concentration compensation coefficient is lower than a predetermined minimum value, an alert signal may be sent by the ammeter 142 to remind an operator to renew the suspension particle filtering structure 120. For instance, the alert signal may be a flash light, or the alert signal may be sent to a terminal equipment via wire or wireless transmission manners by the ammeter 142.

In addition to the above-mentioned methods for calibrating the detected suspension particle concentration, suspension particle samples with known concentration may be initially tested, such that a relationship of the true suspension particle concentration with respect to the detected suspension particle concentration may be obtained. In these embodiments, the suspension particle concentration compensation coefficient may be a ratio of the true suspension particle concentration with respect to the detected suspension particle concentration. According to this relationship, time-dependent suspension particle concentration compensation coefficients may be obtained. Moreover, the time-dependent suspension particle concentration compensation coefficients may be arranged in a table of total detected suspension particle concentrations per unit time with respect to the suspension particle compensation coefficients. As such, the suspension particle concentration compensation coefficient corresponding to the total detected suspension particle concentration up to present (i.e., the instant suspension particle concentration compensation coefficient) may be obtained by looking up the above-mentioned table. The calibrated concentration of the suspension particles may be obtained via dividing the instant detected suspension particle concentration by the instant suspension particle concentration compensation coefficient. In these embodiments, the calibration on the detected suspension particle concentration may be performed via preliminarily test on the suspension particle samples with known concentration. In other words, in these embodiments, the concentration compensation system CS may include the suspension particle concentration sensor 100.

In some embodiments, the concentration compensation system CS may include any one of the flow meter 150, the ammeter 142 disposed on the pumping system 140 and the suspension particle concentration sensor 100. In other embodiments, the concentration compensation system CS may include a combination of at least two of the flow meter 150, the ammeter 142 disposed on the pumping system 140 and the suspension particle concentration sensor 100. In some embodiments, a detection accuracy on the concentration of PM 2.5 may be improved from 69.6% to 89.3% by disposing the concentration compensation system CS.

Figure 4:
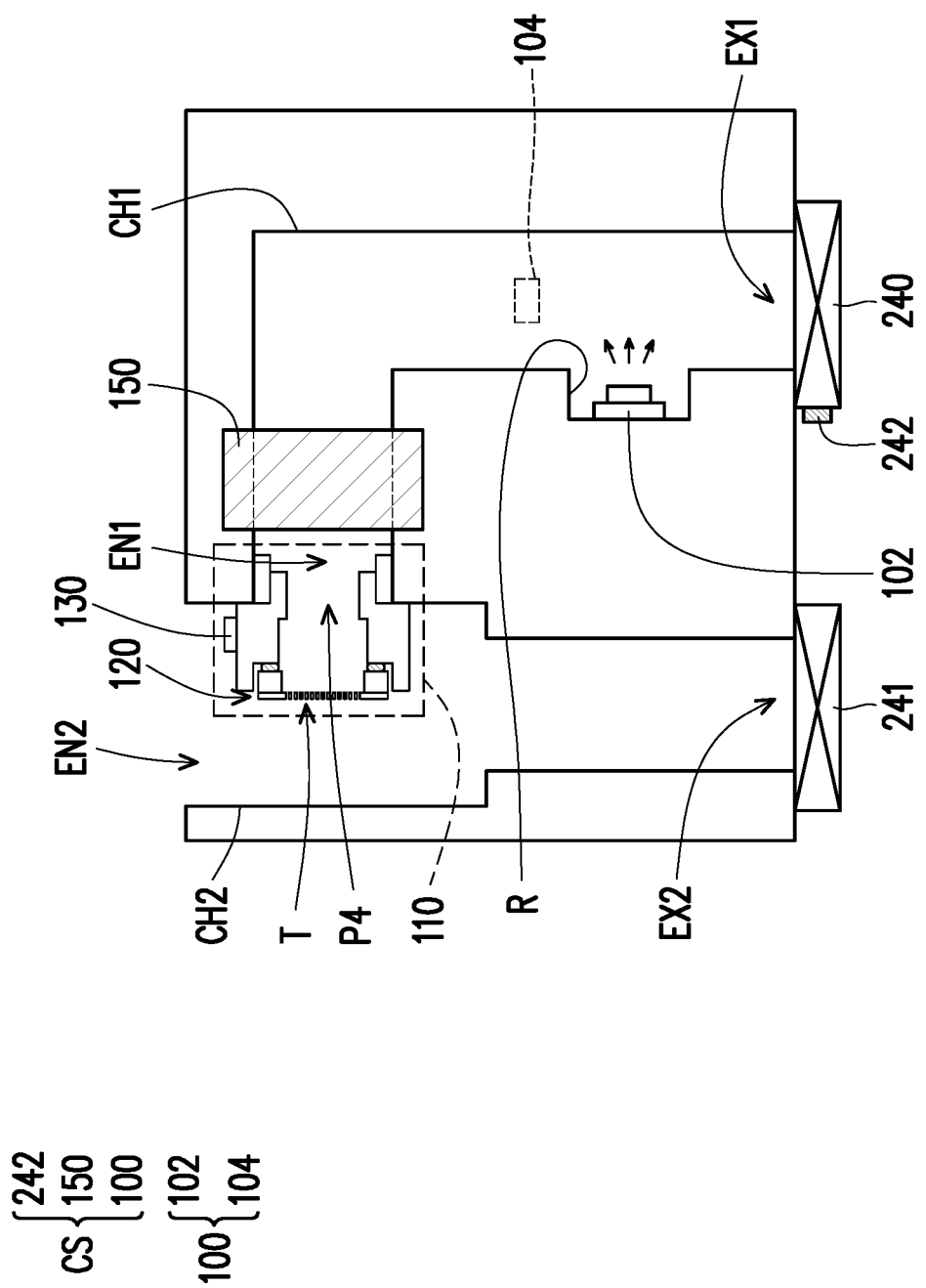
FIG. 4 is a schematic diagram of a suspension particle sensing apparatus according to some embodiments of the present disclosure.

FIG. 4 is a schematic diagram of a suspension particle sensing apparatus 20 according to some embodiments of the present disclosure. The suspension particle sensing apparatus 20 as shown in FIG. 4 is similar to the suspension particle sensing apparatus 10 as shown in FIG. 1A. Only the difference therebetween will be described, the same or similar parts will be omitted. In addition, the same or the like reference symbols in FIG. 1A and FIG. 4 indicated the same or the like elements.

Referring to FIG. 4, the suspension particle sensing apparatus 20 further includes a second flow channel CH2. The second flow channel CH2 has a second entrance EN2 and a second exit EX2. A portion of the second flow channel CH2 between the second entrance EN2 and the second exit EX2 has an opening P4. The opening P4 is communicated with the first entrance EN1 of the first flow channel CH1. In these embodiments, the first entrance EN1 of the first flow channel CH1 is communicated with the second flow channel CH2 through the suspension particle filtering assembly 110. The air flow carrying suspension particles may enter the suspension particle sensing apparatus 20 via the second entrance EN2 of the second flow channel CH2. The suspension particles smaller than an aperture of the through holes T of the suspension particle filtering structure 120 may enter the first flow channel CH1 via the suspension particle filtering structure 120, whereas the suspension particles larger than the aperture of the through holes T of the suspension particle filtering structure 120 may leave the suspension particle sensing apparatus 20 along the second flow channel CH2. By disposing the second flow channel CH2, the large suspension particles or dust in the atmosphere can be removed from the suspension particle filtering structure 120 along the second flow channel CH2. Accordingly, a problem of the suspension particle filtering structure 120 being jammed by the large suspension particles or the dust from the atmosphere can be addressed. Therefore, a detection accuracy of the suspension particle sensing apparatus 20 on the concentration of the suspension particles can be further improved.

In some embodiments, the suspension particle sensing apparatus 20 may further include a first flow channel pumping system 240 and a second flow channel pumping system 241. The first flow channel pumping system 240 may be communicated with the first exit EX1 of the first flow channel CH1. The second flow channel pumping system 241 may be communicated with the second exit EX2 of the second flow channel CH2. By respectively adjusting the pumping velocity of the first flow channel pumping system 240 and the second flow channel pumping system 241, flow rate of the air flow carrying the suspension particles through the first flow channel CH1 can be effectively controlled, and the large suspension particles or the dust from the atmosphere can be efficiently withdrawn from the suspension particle sensing apparatus 20 along the second flow channel CH2. In some embodiments, the first flow channel pumping system 240 is a pumping system with a feedback compensation function, and an ammeter 242 may be disposed on the first flow channel pumping system 240. In these embodiments, independent pumping systems are equipped to the first flow channel CH1 and the second flow channel CH2.

In some embodiments, the large suspension particles deposited on the suspension particle filtering structure 120 may be further removed by a combination of the vibrator 130 and the second flow channel pumping system 241. In some embodiments, the first flow channel pumping system 240 may be stopped once in a while, and the vibrator 130 is turned on and the pumping velocity of the second flow channel pumping system 241 is raised at the same time, in order to purge the suspension particle filtering structure 120. In other embodiments, the first flow channel CH1 and the second flow channel CH2 may be communicated to the same pumping system.

Figure 5:
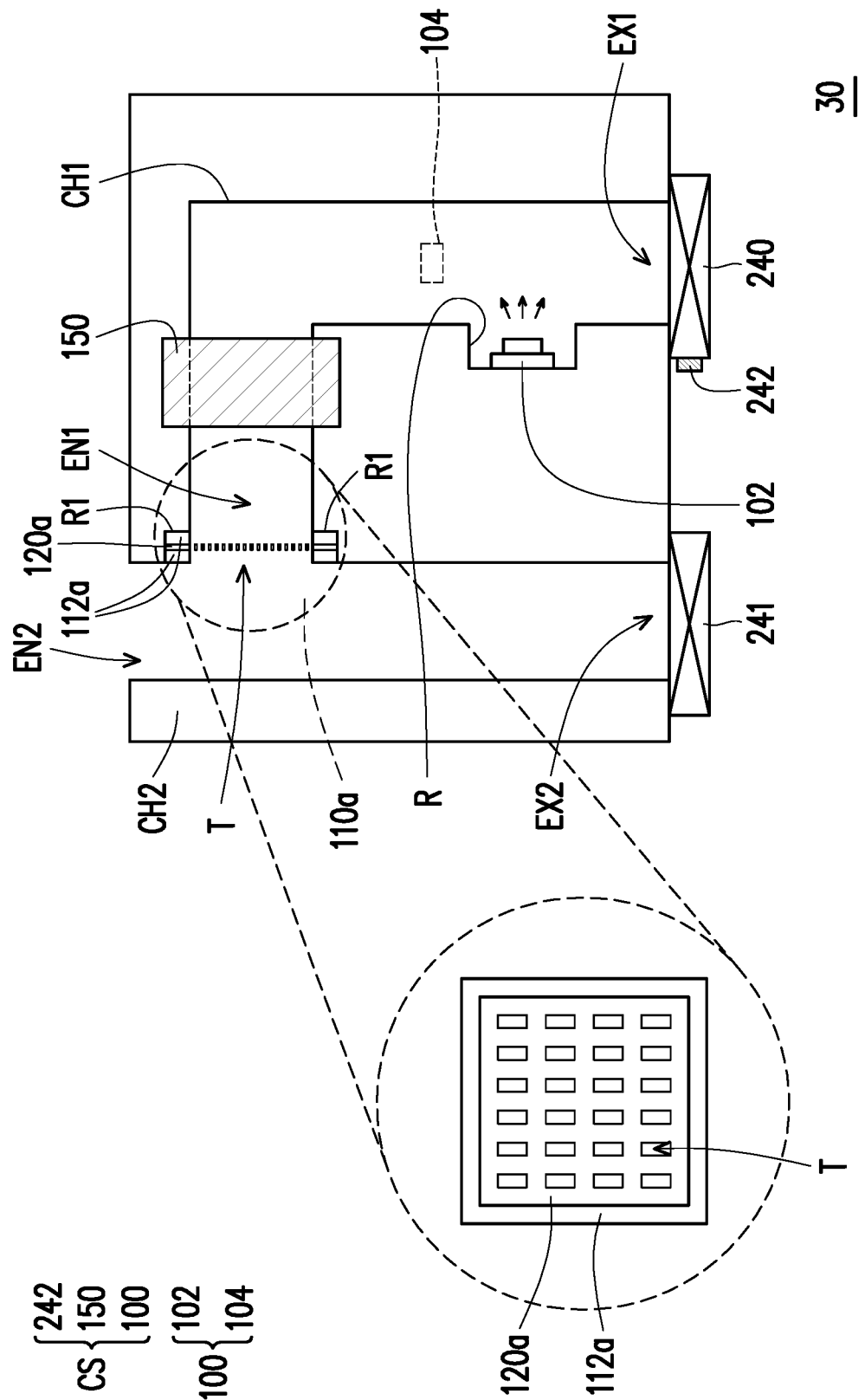
FIG. 5 is a schematic diagram of a suspension particle sensing apparatus according to some embodiments of the present disclosure.

FIG. 5 is a schematic diagram of a suspension particle sensing apparatus 30 according to some embodiments of the present disclosure. The suspension particle sensing apparatus 30 as shown in FIG. 5 is similar to the suspension particle sensing apparatus 20 as shown in FIG. 4. Only the difference therebetween will be described, the same or similar parts will be omitted. In addition, the same or the like reference symbols in FIG. 5 and FIG. 4 indicated the same or the like elements.

Referring to FIG. 5, a suspension particle filtering assembly 110*a* of the suspension particle sensing apparatus 30 may be disposed in the first flow channel CH1, and a surface of the suspension particle filtering assembly 110*a* may be substantially coplanar with a sidewall of the second flow channel CH2. In some embodiments, the second flow channel CH2 is in a shape of straight tube. In these embodiments, a size of the suspension particle filtering assembly 110*a* may be greater than a size of the first flow channel CH1. In addition, the sleeve SL may be omitted, and a recess R1 may be formed at a sidewall of the first flow channel CH1 close to the first entrance EN1. The suspension particle filtering assembly 110*a* is fixed at the recess R1. Moreover, the vibrator 130 may be omitted as well. Since the surface of the suspension particle filtering assembly 110*a* is substantially coplanar with the sidewall of the second flow channel CH2, a roughness of an inner surface of the second flow channel CH2 can be lowered. As such, a turbulence of the air flow caused by the unevenness of the inner surface of the second flow channel CH2 can be avoided, and an interference on removing the large suspension particles or the dust from the atmosphere can be avoided. In other words, a detection accuracy of the suspension particle sensing apparatus 30 can be improved, and the large suspension particles or the dust from the atmosphere can be efficiently removed along the second flow channel CH2. When the second flow channel is in a shape of straight tube, influence on the air flow rate in the first flow channel caused by external environment change (i.e., change on wind velocity) can be avoided. Thus, influence on the detection accuracy on concentration of the suspension particles can be avoided.

In some embodiments, the suspension particle filtering assembly 110*a* includes a suspension particle filtering structure 120*a* and a casing 112*a*. The casing 112*a* has an opening in its central region, and a body portion of the casing 112*a* has a recess. The suspension particle filtering structure 120*a* may be held in the recess, and the through holes T of the suspension particle filtering structure 120*a* may be communicated with the central opening of the casing 112*a*. As such, the through holes T are communicated with the first flow channel CH1 and the second flow channel CH2. In some embodiments, the opening of the casing 112a may be in a circular shape, a rectangular shape, a polygonal shape or other shapes. Those skilled in the art may adjust the dimension, shape and material of the casing 112a, the present disclosure is not limited thereto.

As above, the suspension particle sensing apparatus of the present disclosure includes the suspension particle filtering assembly disposed at the entrance of the flow channel, and includes the suspension particle concentration sensor disposed in the flow channel. The suspension particle filtering assembly includes the suspension particle filtering structure having the through holes. The suspension particles entering the flow channel can be filtered by the suspension particle filtering structure. The suspension particles having a diameter less than the aperture of the through holes may enter the flow channel, whereas the suspension particles having a diameter greater than the aperture of the through holes may be blocked from entering the flow channel. As such, the size of the suspension particles in the flow channel can be controlled, so as to improve the detection accuracy on the concentration of the suspension particles with a certain diameter range. In addition, the suspension particle filtering assembly may further include a vibrator. By applying the vibrator, the large suspension particles unable to enter the through holes and deposited on the suspension particle filtering structure can be removed. Thus, decrease of the detection accuracy on the concentration of the suspension particles caused by jamming of the through holes can be avoided. In some embodiments, the suspension particle sensing apparatus further includes a concentration compensation system. The concentration compensation system is configured to calculate the suspension particle concentration compensation coefficient according to the flow rate of the air flow carrying the suspension particles through the flow channel or the known/detected concentration values of the suspension particles. This suspension particle concentration compensation coefficient can be applied to calibrate the detected concentration value obtained by the suspension particle concentration sensor. Therefore, the detection accuracy on the concentration of the suspension particles can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A suspension particle sensing apparatus, comprising:
a first flow channel, having a first entrance and a first exit;
a suspension particle concentration sensor, disposed in the first flow channel, and located between the first entrance and the first exit;
a second flow channel, having a second entrance and a second exit, wherein the first entrance of the first flow channel is communicated with an opening of the second flow channel that is located between the second entrance and the second exit; and
a suspension particle filtering assembly, disposed at the first entrance of the first flow channel, and comprising:
a casing, having a first opening and a second opening, wherein the first opening is communicated with the first entrance of the first flow channel; and
a suspension particle filtering structure, covering the second opening.

2. The suspension particle sensing apparatus as claimed in claim 1, further comprising a vibrator, disposed on a surface of the casing.

3. The suspension particle sensing apparatus as claimed in claim 2, wherein the vibrator comprises a vibration motor, a piezoelectric microactuator or a combination thereof.

4. The suspension particle sensing apparatus as claimed in claim 1, further comprising a pumping system, disposed at the first exit of the first flow channel.

5. The suspension particle sensing apparatus as claimed in claim 1, further comprising a first flow channel pumping system and a second flow channel pumping system, wherein the first flow channel pumping system is communicated with the first flow channel, and the second flow channel pumping system is communicated with the second flow channel.

6. The suspension particle sensing apparatus as claimed in claim 1, wherein a surface of the suspension particle filtering assembly is substantially coplanar with a sidewall of the second flow channel.

7. The suspension particle sensing apparatus as claimed in claim 1, wherein the suspension particle filtering structure comprises:
a semiconductor substrate, having an opening communicated with the first opening of the casing; and
a suspension particle filtering layer, disposed on the semiconductor substrate, and having a plurality of through holes, wherein the plurality of through holes are communicated with the opening of the semiconductor substrate, and the plurality of through holes have substantially the same aperture and substantially the same shape.

8. The suspension particle sensing apparatus as claimed in claim 7, wherein the aperture of each through hole is substantially constant along an extension direction of the through hole, or the aperture of each through hole gradually diverges toward a side of the suspension particle filtering layer facing the semiconductor substrate.

9. The suspension particle sensing apparatus as claimed in claim 7, wherein a surface of the suspension particle filtering structure is coated with a surface modification layer.

10. The suspension particle sensing apparatus as claimed in claim 1, wherein a material of the suspension particle filtering structure comprises polytetrafluoroethene, polypropylene, stainless steel or polycarbonate, and wherein the suspension particle filtering structure has a plurality of through holes.

11. A suspension particle sensing apparatus, comprising:
a first flow channel, having a first entrance and a first exit;
a suspension particle concentration sensor, disposed in the first flow channel, and located between the first entrance and the first exit and located in the vicinity of the first exit;
a suspension particle filtering assembly, disposed at the first entrance of the first flow channel, and comprising:
a casing, having a first opening and a second opening, wherein the first opening is communicated with the first entrance of the first flow channel; and
a suspension particle filtering structure, covering the second opening and having a plurality of holes; and
a concentration compensation system, including at least a flow meter, and configured to calculate a suspension particle concentration compensation coefficient according to a variation of an air flow rate in the first flow channel measured by the flow meter or to known and detected concentration values of the suspension particles in the first flow channel obtained by the suspension particle concentration sensor, wherein the suspension particle concentration compensation coefficient is applied to calibrate a detection value of the suspension particle concentration sensor.

12. The suspension particle sensing apparatus as claimed in claim 11, further comprising a vibrator, disposed on a surface of the casing.

13. The suspension particle sensing apparatus as claimed in claim 11, further comprising a second flow channel, having a second entrance and a second exit, wherein the first entrance of the first flow channel is communicated with an opening of the second flow channel that is located between the second entrance and the second exit.

14. The suspension particle sensing apparatus as claimed in claim 11, wherein the flow meter is disposed between the first entrance and the first exit of the first flow channel, and is configured to record the air flow rate in the first flow channel per unit time.

15. The suspension particle sensing apparatus as claimed in claim 11, further comprising a pumping system, disposed at the first exit of the first flow channel, wherein the pumping system is capable of adjusting a pumping velocity according to an inlet pressure of the pumping system, so as to maintain a substantially constant exhaust volume.

16. The suspension particle sensing apparatus as claimed in claim 15, wherein the concentration compensation system comprises an ammeter, the ammeter is disposed on the pumping system, and configured to record a variation of an input current of the pumping system per unit time.

* * * * *